US009178952B2

(12) United States Patent
Acharya et al.

(10) Patent No.: US 9,178,952 B2
(45) Date of Patent: Nov. 3, 2015

(54) SYSTEMS AND METHODS FOR SERVICE ASSURANCE USING VIRTUALIZED FEDERATED PRESENCE INFRASTRUCTURE

(75) Inventors: Arup Acharya, Nanuet, NY (US);
Nilanjan Banerjee, West Bengal (IN);
Dipanjan Chakraborty, Kolkata (IN);
Koustuv Dasgupta, New Delhi (IN);
Chetan Desai, Overland, KS (US);
Piyush Sarwal, Leawood, KS (US);
Shachi Sharma, Delhi (IN); Xiping Wang, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 723 days.

(21) Appl. No.: 12/792,360

(22) Filed: Jun. 2, 2010

(65) Prior Publication Data

US 2011/0302292 A1    Dec. 8, 2011

(51) Int. Cl.
*G06F 15/173* (2006.01)
*H04L 29/08* (2006.01)
*H04L 12/24* (2006.01)
*H04L 29/06* (2006.01)

(52) U.S. Cl.
CPC .............. *H04L 67/24* (2013.01); *H04L 41/12* (2013.01); *H04L 69/08* (2013.01); *H04L 69/28* (2013.01)

(58) Field of Classification Search
CPC ... H04L 41/12; H04L 67/24; H04L 29/08684; H04L 12/2416; H04M 3/42365
USPC .......................................................... 709/224
See application file for complete search history.

(56) References Cited

U.S. PATENT DOCUMENTS

| 8,315,611 | B2* | 11/2012 | Colon ........................ 455/414.4 |
|---|---|---|---|
| 2005/0099940 | A1* | 5/2005 | Ohenoja et al. ............... 370/217 |
| 2005/0132026 | A1* | 6/2005 | Govil ............................ 709/220 |
| 2006/0178898 | A1 | 8/2006 | Habibi |
| 2008/0285540 | A1* | 11/2008 | Burckart et al. .............. 370/351 |
| 2009/0112988 | A1* | 4/2009 | Colon ........................... 709/204 |
| 2010/0075673 | A1* | 3/2010 | Colbert et al. ............. 455/435.1 |
| 2010/0077018 | A1 | 3/2010 | Acharya et al. |
| 2011/0196913 | A1 | 8/2011 | Acharya |

* cited by examiner

*Primary Examiner* — Esther B Henderson
(74) *Attorney, Agent, or Firm* — Ference & Associates LLC (57) ABSTRACT

Systems, methods, apparatuses and program products configured to provide a topology-service tool are described. A presence-federation solution asset is leveraged to address topology-federation problems. A network topology tool takes as input network endpoints, for example caller and callee telephone numbers, determines a network service flow used to connect the network endpoints, and develops a network topology view of the service flow along with associated network device related information.

8 Claims, 9 Drawing Sheets

SYSTEMS AND METHODS FOR SERVICE ASSURANCE USING VIRTUALIZED FEDERATED PRESENCE INFRASTRUCTURE

BACKGROUND

The subject matter described herein generally relates to network topology service flow tools, and more particularly to network topology service tools for Voice over Internet Protocol (VoIP) networks.

Communication networks are widely used for a variety of applications. Consider for example VoIP applications. VoIP is a technology that enables voice calls to be communicated over an Internet connection instead of an analog phone line. VoIP services convert the voice of the caller into digital signal packets that travels over the Internet to the destination (callee's device). Some VoIP services allow calls to any destination ending in a telephone number, for example local, long distance, mobile, and international numbers.

Regardless of the particular type of VoIP service used, it is common that telecommunications providers use VoIP telephony over public IP networks to connect to switching stations and to interconnect with other network providers. Such connections determine the path of the call and can be characterized as the service flow. For example, in a telecommunications network, a portion of the network comprises the intermediate links between the core network (backbone) and small sub-nets at the edge of the network. Devices communicating with an initial link constitute a sub-net, and the connection between the initial link and a worldwide network is enabled via intermediate link(s) to the core of the telephone company's network.

Whatever the particular network links utilized, an understanding of the network topology can facilitate detecting and avoiding problems with service flow (such as a dropped call) in a communications network. This understanding of the network topology can include the distinct path that a particular call took from origination point to its destination point, and the devices through which the call packets were routed. Conventionally, determining the service flow of a particular call includes manual intervention in order to piece together the links of the call from a multitude of disparate sources throughout the network.

BRIEF SUMMARY

Embodiments of the invention broadly contemplate systems, methods, apparatuses and program products configured to provide a topology-service tool that can federate data from multiple sources of information (static or discovered) and provide a seamless, end-to-end topology view (across multiple layers) for a given service flow. Certain embodiments align a presence-federation solution asset to address topology-federation problems. Certain embodiments provide a convenient graphical user interface configured to take as input network endpoints, for example caller and callee telephone numbers, determine a network service flow used to connect the network endpoints, and develop a network topology view of the service flow along with associated network device related information.

In summary, one aspect provides a method comprising: accepting query input comprising identification of network connected devices; communicating the query input to a virtualized presence server; and obtaining a resolved network topology for the network connected devices of the query input.

Another aspect provides a computer program product comprising: a computer readable storage medium having computer readable program code embodied therewith, the computer readable program code comprising: computer readable program code configured to accept query input comprising identification of network connected devices; computer readable program code configured to communicate the query input to a virtualized presence server; and computer readable program code configured to obtain a resolved network topology for the network connected devices of the query input.

A further aspect provides an apparatus comprising: one or more processors; and a memory operatively connected to the one or more processors; wherein, responsive to execution of computer readable program code accessible to the one or more processors, the one or more processors are configured to: accept query input comprising identification of network connected devices; communicate the query input to a virtualized presence server; and obtain a resolved network topology for the network connected devices of the query input.

The foregoing is a summary. For a better understanding of example embodiments, together with other and further features and advantages thereof, reference is made to the following description, taken in conjunction with the accompanying drawings, and the scope of the invention will be pointed out in the appended claims.

BRIEF DESCRIPTION OF THE SEVERAL VIEWS OF THE DRAWINGS

FIG. 6(A-B) illustrates example views of interfaces for entering queries regarding service flow.

DETAILED DESCRIPTION

It will be readily understood that components of the embodiments, as generally described and illustrated in the figures herein, may be arranged and designed in a wide variety of different configurations in addition to the described example embodiments. Thus, the following more detailed description of example embodiments, as represented in the figures, is not intended to limit the scope of the invention, as claimed, but is merely representative of various example embodiments.

Reference throughout this specification to "one embodiment" or "certain embodiments" (or the like) means that a particular feature, structure, or characteristic described in connection with the embodiment is included in at least one embodiment. Thus, appearances of the phrases "in certain embodiments" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of example embodiments. One skilled in the relevant art will recognize, however, that various embodiments can be practiced without one or more of the specific details, or with other methods, components, materials, et cetera. In other instances, well-known structures, materials, or operations are not shown or described in detail to avoid obfuscation.

Conventionally, determining the service flow of a particular call includes manual intervention in order to piece together the links of the call from a multitude of disparate sources throughout the network. Given an caller ID and a callee ID, a technician conventionally would need to determine, based on relative locations, the devices through which the call could have been routed. The technician conventionally must access the various devices and determine through which device the call was routed and must also determine device-related information (for example, known problems/issues with the device) regarding the device(s) in order to determine possible causes for a problematic call. Given the number and type of devices involved, such tracking of service flow is unsatisfactory.

Accordingly, embodiments of the invention broadly contemplate systems, methods, apparatuses and program products configured to provide a topology-service tool that can federate data from multiple sources of information (static or discovered) and provide a seamless, end-to-end topology view (across multiple layers) for a given service flow. Embodiments align a presence-federation solution asset to address topology-federation problems. Certain embodiments focus on VoIP service, but are generally applicable to various types of service flows. Certain embodiments provide a convenient graphical user interface configured to take as input network endpoints, for example caller and callee telephone numbers, determine a network service flow used to connect the network endpoints, and develop a network topology view of the service flow along with associated network device related information.

The description now turns to the figures. The illustrated example embodiments will be best understood by reference to the figures. The following description is intended only by way of example and simply illustrates certain example embodiments.

Figure 1:
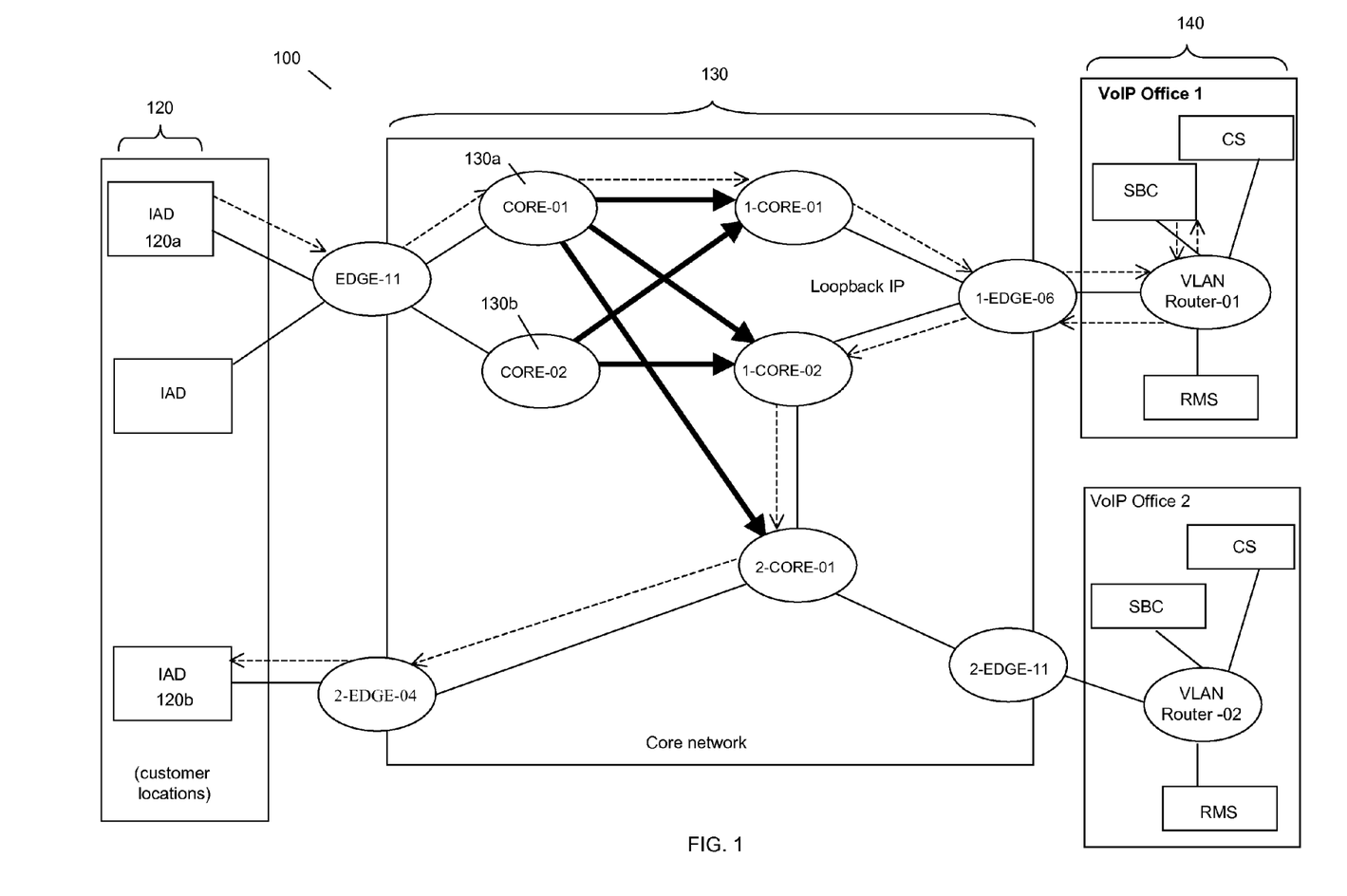
FIG. 1 illustrates an example view of a VoIP network topology.

Referring to FIG. 1, an example, simplified view of a VoIP network topology 100 is illustrated. Various Internet Access Devices (IAD) 120 connect to a network of elements 130 and to one or more VoIP telephony offices 140. For example, a caller IAD 120a may place a call which is routed through network elements 130 to a VoIP office 140 (VoIP Office 1) at a particular geographic location. In FIG. 1, the dashed arrows indicate an actual path of the call as it is routed through the network. As shown, various network elements will have connectivity to more than one other network element. Therefore, the path of the call can take various forms depending on how it is routed to the next network element. For example, core router 130a may route through any of three other core elements (1-CORE-01, 1-CORE-02, or 2-CORE-02). Likewise, core router 130b may route through any of two other core elements (1-CORE-01 or 1-CORE-02). Thus, the actual path and devices (service flow) through which a call's data is routed is not immediately apparent unless a significant amount of relevant (and time sensitive) information is gathered. For example, determining a likely path for the call would include gathering device specific information such as routing table(s) in order to piece together a potential service flow. Such information can be useful in a variety of situations, such as assigning a cause of poor call quality, because network device information (know problems/issues with a particular device) can be matched to the service flow once it is identified.

Rather than have technicians engage in manual intervention to piece together a given service flow, embodiments of the invention align a presence-federation solution asset to address topology-federation problems. A presence-federation solution asset is particularly well suited to gather dynamically changing information (presence information), such as is generated by network elements (for example, core and edge routers within a VoIP network). Some useful contextual information regarding presence-virtualization solution assets is found in co-pending and commonly assigned United States Patent Applications: entitled PROGRAMMABLE PRESENCE VIRTUALIZATION (application Ser. No. 12/701,793), and entitled VIRTUAL PRESENCE SERVER (application Ser. No. 12/233795), both of which are incorporated by reference here.

Presence can be broadly defined as the ability of a communications infrastructure to both track and disseminate a variety of dynamic attributes of individuals, objects and/or devices, and is rapidly becoming a key component of converged network applications in both telephone company provider and enterprise environments. Presence is rapidly becoming a standard event mechanism for aggregating context about individuals and devices. In this regard, certain embodiments are configured to gather presence information regarding network elements in order to maintain service flow information that can be queried.

The term "presentity" as used herein is intended to be construed broadly so as to encompass, by way of example and without limitation, an entity identified by presence information (for example, document indicating connectivity or operability of a network device such as a router) and that is associated with a unique resource identifier or indicator (for example, a URI). The word is a combination of words "presence" and "entity" and was first introduced in by the Internet Engineering Task Force (IETF).

The term "virtual presentity" as used herein is intended to be construed broadly so as to encompass, by way of example and without limitation, a presence entity that is created by the virtual presence server (VPS), or some external source, in response to some specified computing logic or query operating over the aggregated presence information of other existing presentities, such that the attributes of the virtual presentity correspond to answers, either wholly or partially, to the specified computing logic. In contrast, "non-virtual" or "real" presentities correspond to presence entities that exist independently of an external query, for example, a presentity for a network routing device captures the state of the network routing device, independently of the queries or interests expressed by any other entity, device or computing system. The "virtual presentity" may thus be viewed as a presence-based abstract view, corresponding to some computing logic, expressed over aggregated presence information of other presentities (both "real" and "virtual") or external data sources. Thus, it is to be understood that the VPS is preferably a physical server that handles virtual presentities in the manner described herein.

Figure 2:
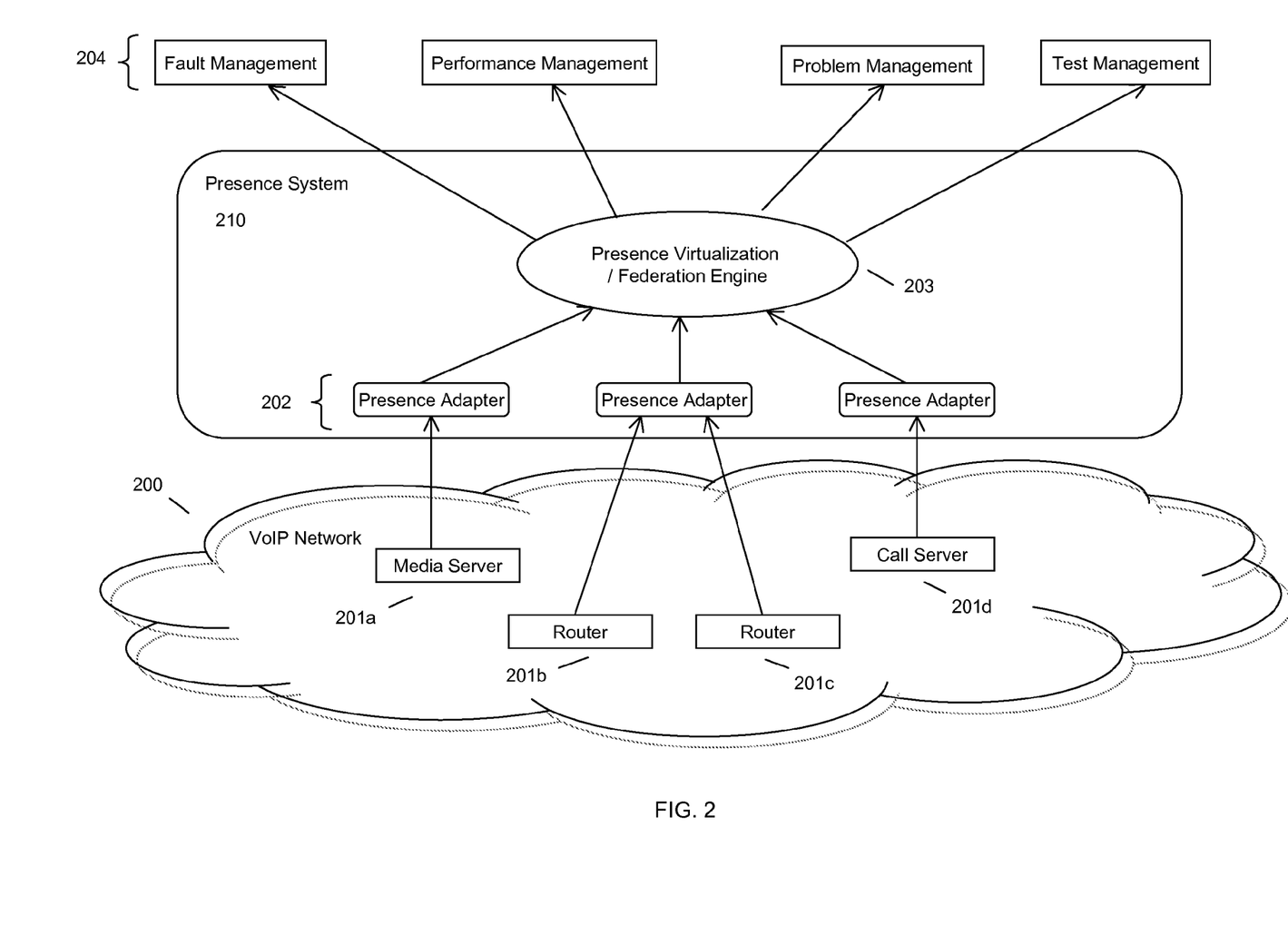
FIG. 2 illustrates a high-level, example view of a system configured to provide service assurance through a virtualized federated presence infrastructure.

Referring to FIG. 2, a VoIP network 200 will include a plurality of network elements 201a, 201b, 201c, and 201d.

Though not shown, it will be readily understood that the network elements 201a, 201b, 201c, and 201d can be interconnected in a variety of ways to provide a network for communicating between points, such as during a VoIP call. Presence information regarding the network elements 201a, 201b, 201c, and 201d can be gathered by one or more adapters 202. Such presence information can include for example current routing table(s) indicating connectivity between the various network elements, including the depicted network elements 201a, 201b, 201c, and 201d. The adapters 202 are configured to gather the presence information from the network elements, either by proprietary or some standardized mechanism. Thus, adapters 202 push presence information, such as a change in routing or operability of a network element, or a problem ticket of a network element, into a presence virtualization/federation engine 203.

The presence adapters 202 transforms real-world events (from use-case domains, such as regarding network routing elements in VoIP network 200) into presence events (for example, SIP, Session Initiation Protocol, PUBLISH). Real-world events can include, for example, network events, call setup/teardown, topology change, event router state, network link up/down, and the like. The adapters 202 can also adaptively control rate of presence publication to help scalability. The adapters 202 in turn provide presence information to a virtualization/federation engine 203, which can include a VPS.

The presence virtualization/federation engine 203 is configured to gather different types of presence information from disparate sources (for example, different network elements), as communicated via the adapters 202 and presence servers, and facilitate querying of presence information. Certain embodiments of the invention provide presence virtualization, facilitate query capability on presence data, and represent queries as virtual presentities. By virtue of the virtualization/federation engine 203 and the querying it supports, various categories of queries regarding the underlying network 202 can be answered. For example, various queries can be applied to a set of common service flow issues 203 including but not limited to fault management, performance management, problem management and test management.

Figure 3:
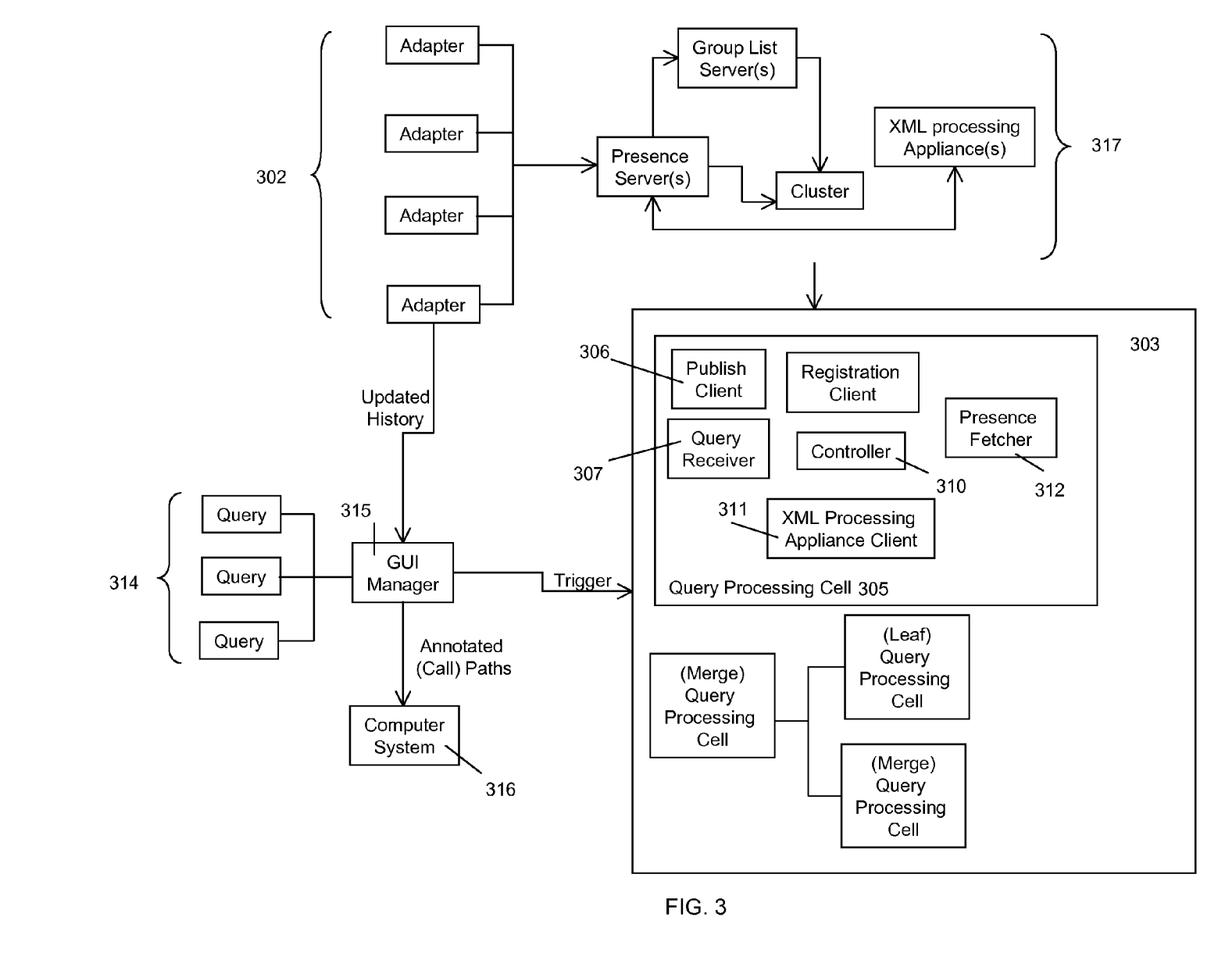
FIG. 3 illustrates an example view of a system configured to provide responses to queries regarding service flow through a virtualized federated presence infrastructure.

Turning to FIG. 3, an illustrative example of a presence system is provided. One or more adapters 302 are configured to gather raw presence information from underlying network elements. This raw presence information is directed to a first level of devices 317, which includes for example one or more presence servers. The first level of devices 317 maintains the raw presence information, and a presence virtualization/federation engine 303 facilitates querying of this information via a client computer system 316.

Presence virtualization/federation engine 303 includes one or more query processing cell 305 (QPC). QPCs 305 are used to implement a scalable virtualization platform that can simultaneously support a large number of virtualization queries 314. A QPC 305 is a software object that effectively represents a virtual presentity (with a dynamically assigned URI) defined by a specific membership set such that its presence status is an aggregation of the presence data of individual members of the membership set. As described herein, a VPS can be viewed as a collection of QPCs 305, whose creation, termination and inter-QPC coordination are orchestrated to fetch presence information.

Internally, each QPC 305 can include, as illustrated in FIG. 3, the following components. A presence fetcher component 312 interacts with a presence server to setup subscriptions on the underlying presence server and obtain the presence information, for example XML documents having routing table information, of a standalone router or a group of routers, as specified in membership set. A controller component 310 orchestrates different components inside QPC 305, for example when presence fetcher component 312 receives presence information from presence server, controller receives trigger from presence fetcher component 312 and redirects the trigger to XML processing appliance 311. The XML processing appliance 311 efficiently applies transformations (XSLT) to the aggregated presence information of the membership set (obtained by the presence fetcher 312).

A query receiver component 307 manages the external queries 314 issued by the query client 316 via a GUI manager 315. This could include for example handling session initiation protocol (SIP) based requests (SUBSCRIBEs) from the client 316 of the QPC 305, and issuing NOTIFYs (containing the results of (XSLT) transforms) to the QPC's client 316.

Figure 4A:
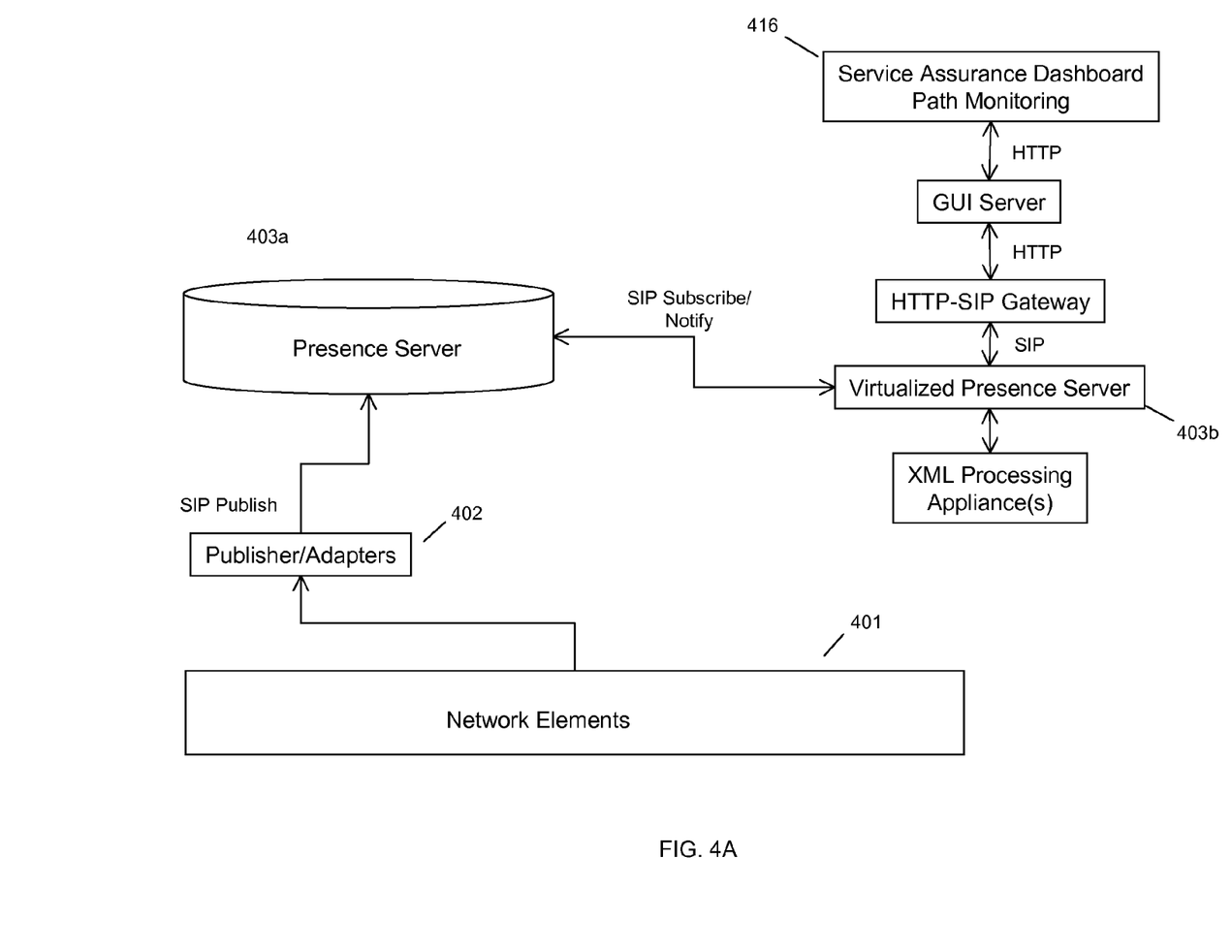
FIG. 4A illustrates an example view of a system configured to provide responses to queries regarding service flow through a virtualized federated presence infrastructure.

Referring to FIG. 4A, network elements 401 push presence information to one or more adapters 402. The presence information includes changes in real-time information of the network element(s) 401. For example, a network router can push presence information in the form of an XML document containing updated routing information. The presence adapter 402 in essence transforms real-world events (from use-case domain) into presence events (for example, PUBLISH). Real-world events can include, for example, network events, call setup/teardown, topology change, event router state, network link up/down etc. The adapter 402 can also adaptively control rate of presence publication to help scalability. The adapters 402 can modify and then push the presence information into the presence server 403a. The presence server 403a is then in possession of presence information regarding the underlying network topology.

One or more queries can be directed to the presence server 403a via the VPS 403b. The usefulness of the virtualization layer afforded by the VPS 403b includes for example a mechanism for taking disparate queries and transforming them into a manageable subscription to a member set of network presence information. As an example, the virtualization allows an input of caller and callee IDs to be routed as a subscription request for presence information of the member set of routing elements providing the service flow connecting the caller and callee. Thus, one or more queries issued via a dashboard program of a client 316 can be mapped to a member set's presence information, as stored in the presence server 403a.

Figure 4B:
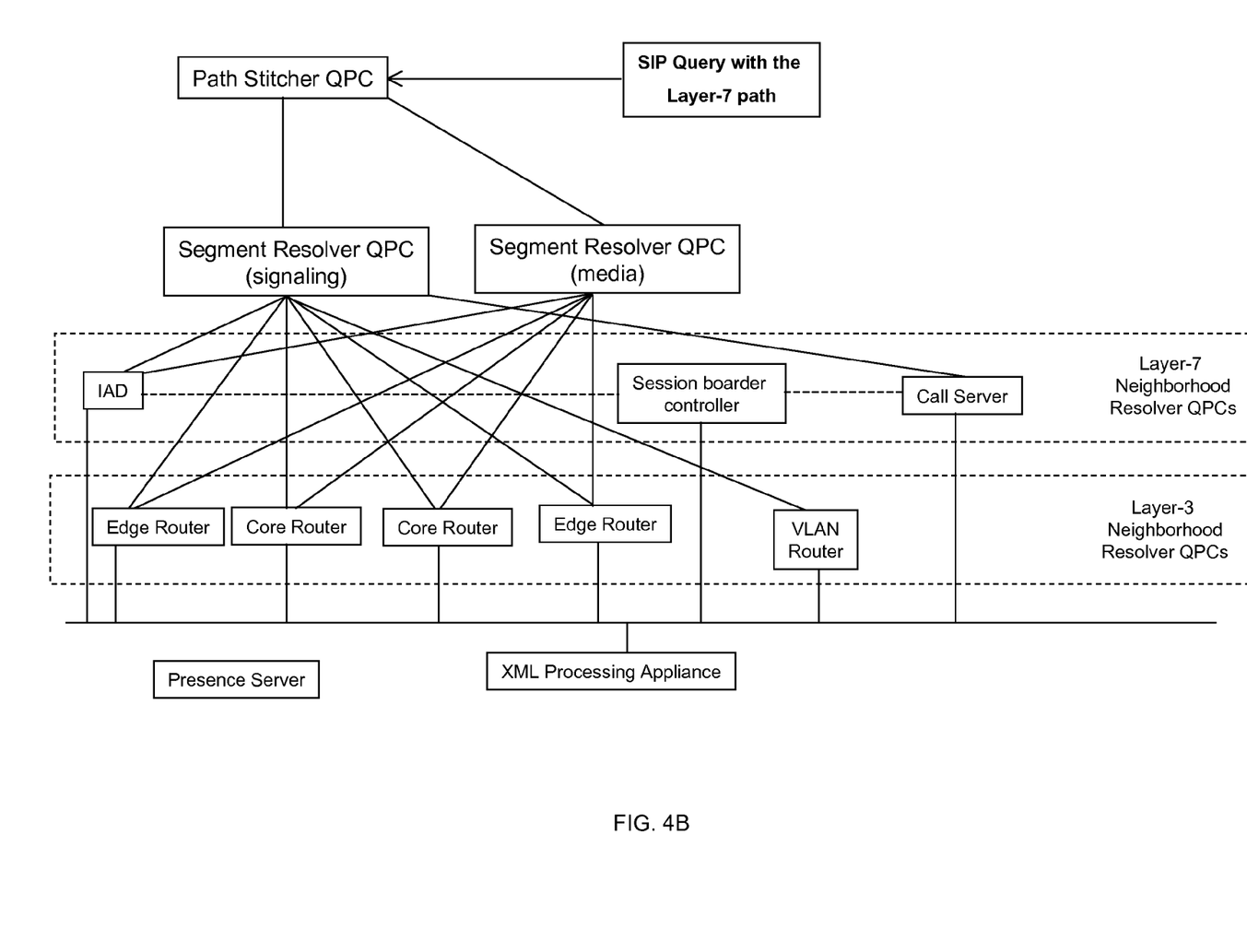
FIG. 4B illustrates how hierarchy of query processing cells (QPCs) can be used to implement topology stitching service logic.

FIG. 4B illustrates how hierarchy of QPCs is used to implement the topology stitching service logic. There are three levels in the hierarchy: Path Stitcher QPC, Segment Resolver QPC and Neighborhood Resolver QPC. The distinction among the QPCs is based on the task they perform. The internal architecture of QPCs is same as shown in FIG. 3. The path stitcher QPC receives a failed call CDR (call detail record) in the form of layer 7 components involved in the call. The path stitcher QPC divides the entire path into multiple segments and passes on the segments to next level, that is the Segment Resolver QPCs. The path stitcher QPC also combines the resolved segments to form the entire resolved path (from layer 7 to layer 3 . . . layer 1 path).

The Segment Resolver QPC resolves the segment and finds layer 3/2/1 nodes and links connecting them. In order to accomplish this task, the Segment Resolver QPC uses Neighborhood Resolver QPCs to find a next hop neighboring node. The advantage of using a hierarchy of QPCs is that the common logic is always re-used in the VPS. This is illustrated in FIG. 4B, as for example because Segment Resolver QPC for media segment and Segment Resolver QPC for signaling reuse the same IAD, Edge Router, Core Router, and Neighborhood Resolver QPCs. This architecture also makes the system scalable.

Figure 5A:
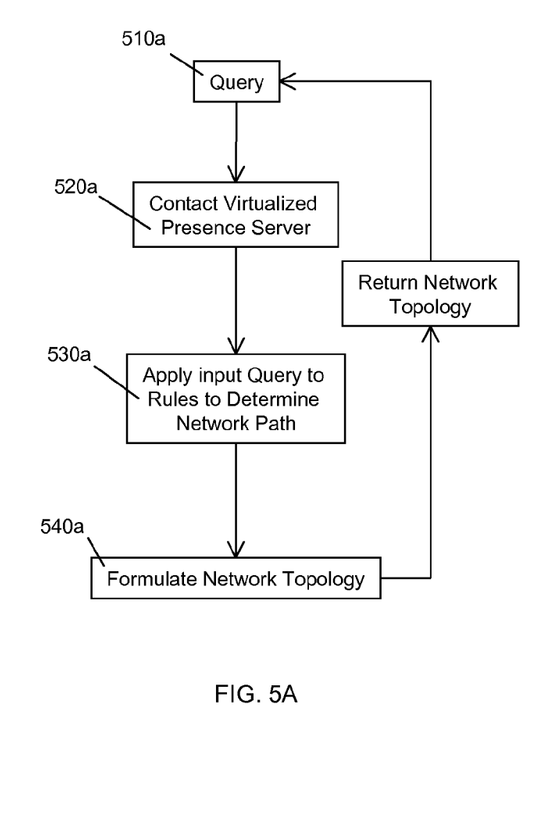
FIG. 5A illustrates an example method for query processing.

Referring to FIG. 5A, an example flow of a query for network topology is illustrated. A user initiates a query for network topology at 510a. The query input can include for example a caller and callee ID. This query could result in response to a problematic call, such as a dropped call or a call having poor quality. At 520a, the query is routed to the virtualized presence server via a query receiver component, as discussed herein. At 530a a set of rules is applied to determine the corresponding presence information relating to the query. The rule set is used to ultimately determine the network path or service flow for the call represented in the query. For example and as described further herein, a set of caller and callee IDs can be taken as input, a first network element identified for linking the caller and callee together, and segmentation resolution rules can be applied to determine the service flow. The result of the service flow determination is a set of network elements indicating the network topology of the call, which can be formulated at 540a and returned to the client device.

Figure 5B:
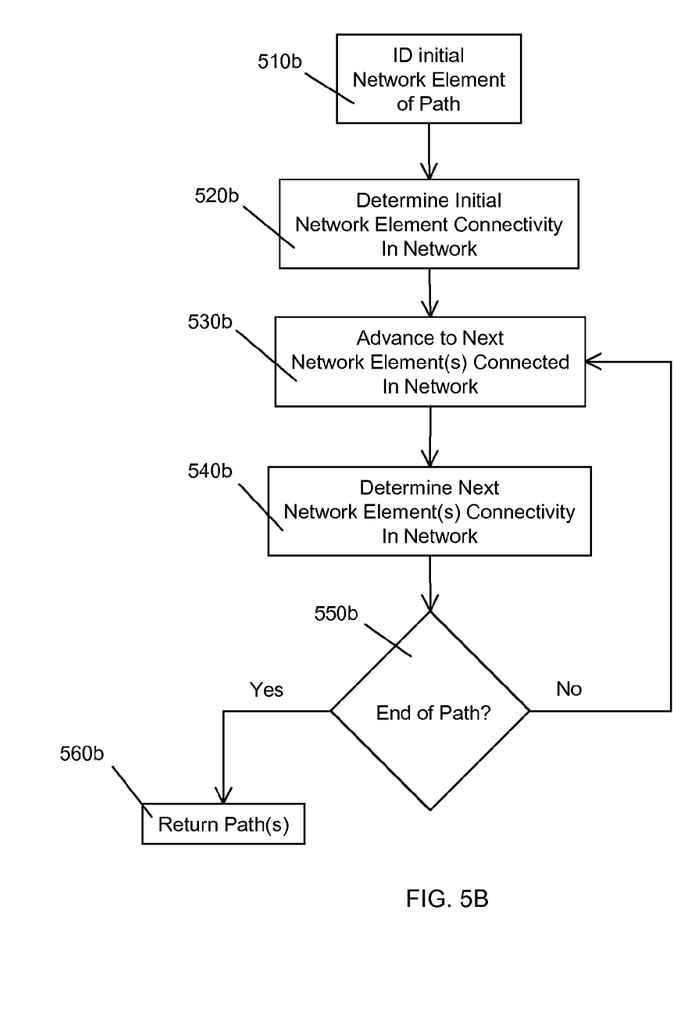
FIG. 5B illustrates an example method of service flow network topology determination.

Referring to FIG. 5B, an example of segment resolution rules to be applied, given a particular query input (for example, caller and callee IDs), is illustrated. At 510b, an initial network element in the service flow is identified using one of the caller and callee ID. This can be determined for example by consulting a stored table of information. At 520b, using for example updated presence information of the network elements, the network connectivity of the initial network element is identified. At 530b, the next network element is identified based on the foregoing information, that is, the next link(s) in the path is identified. For the next link(s), the network connectivity of the network element(s) is/are again identified at 540b. This process continues in order to resolve each segment of the network path for the call. At 550b it is determined if the end of the path has been reached (for example, edge router for the callee). If so, the process has resolved all segments in the path and the path can be returned in order to formulate the network topology. Otherwise, the process can loop back to determine the next link 530b.

Figure 6A:
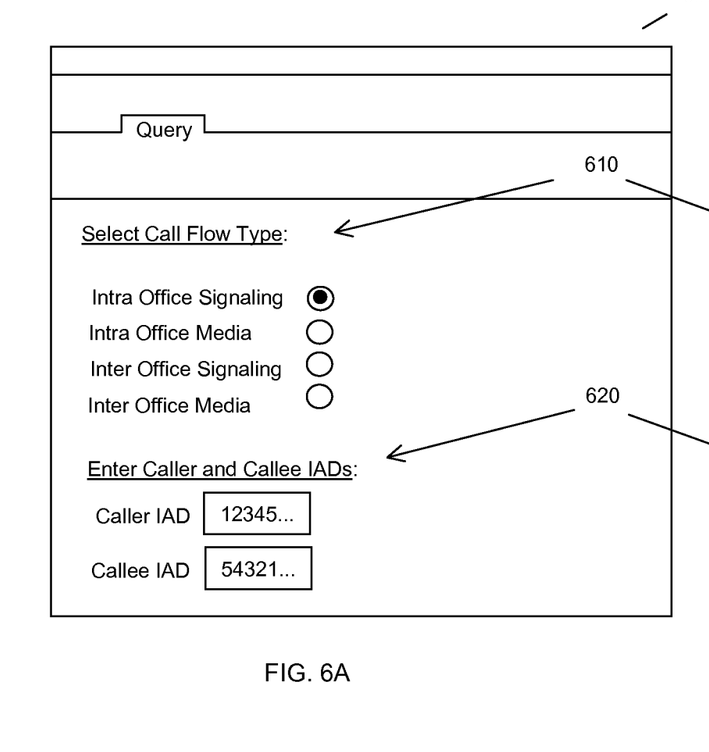
Figure 6B:
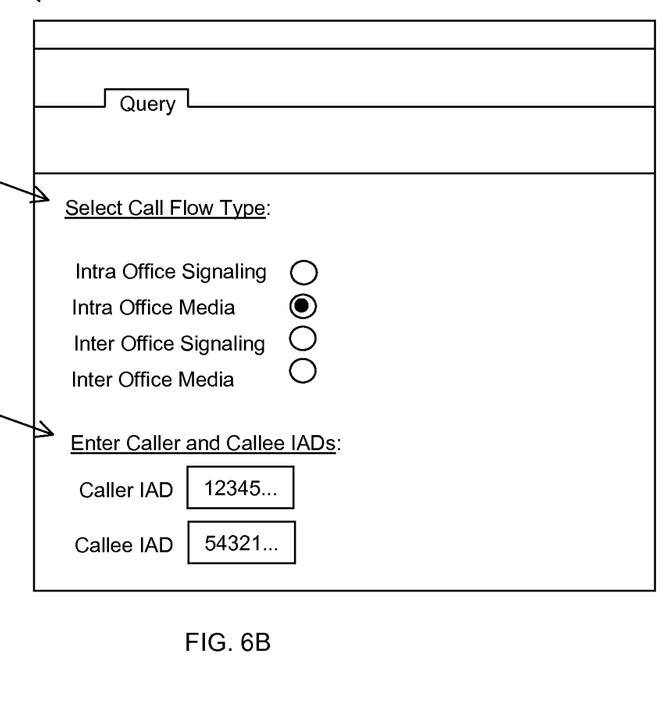

Referring to FIG. 6(A-B), example user interfaces 600 for a network topology tool is illustrated. The network topology tool can be included as a dashboard appliance at a client device 316, controlled via a GUI manager 315. As illustrated, a user may select a call flow type 610 from intra office signaling, intra office media, inter office signaling, and inter office media. The user is also requested to input caller and callee IDs 620, such as caller and callee telephone numbers in the case of a VoIP call. FIG. 6A illustrates a selection of intra office signaling flow type, whereas FIG. 6B illustrates a selection of intra office media flow type; however, these are simply representative examples of suitable user interfaces.

Figure 7:
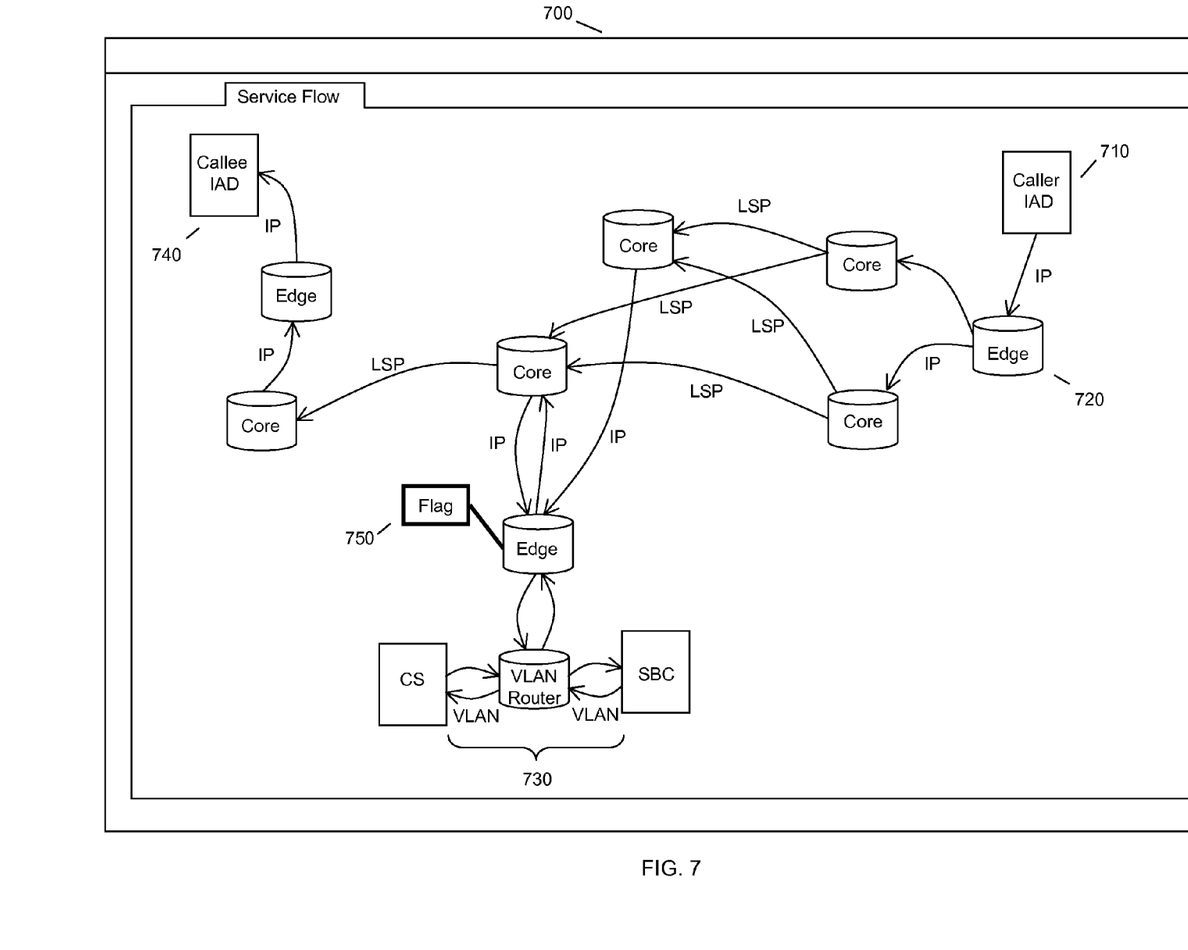
FIG. 7 illustrates an example service flow network topology display.

Once the call flow type 610 and the caller and callee (devices) IDs 620 have been input (query input), GUI manager 315 issues query to QPC 305 as described herein. The resultant compilation of presence information into a network topology is returned as an answer to the input query. An example of a returned network topology 700 is illustrated in FIG. 7.

As shown, a plurality of network segments connecting a plurality of network elements (core routers, edge routers and the like) is returned as a network topology display. These network elements connect caller IAD 710 to callee IAD 740. Thus, the network topology 700 illustrates the network elements and the path(s) through which data is routed. For example, the caller IAD 710 is illustrated as connected to an edge router 720 via an IP connection. The service flow indicates that the call was routed through a regional VoIP office 730 and through various other edge and core routers connecting it to callee IAD 740.

Having access to an automatically generated network topology 700 is advantageous for a variety of reasons, including but not limited to problem management. As a non-limiting example, the presence information gathered and accessed as part of the network topology generation can include device related information over and above connectivity indications. For example, illustrated at 750 is a flag (for example, some user perceivable indication) included for an edge router connecting the local VoIP office 730 to the broader network. The user can retrieve information relating to the device, for example by clicking on the flag, a text box can present the device-related information to the user. This flag 750 is automatically generated by the network topology tool to represent some important item of information included in the presence information of that edge router. For example, there could be a known problem/issue with that edge router. Accordingly, the network topology tool automatically includes device-related information as part of the network topology display 700. This allows for very efficient problem resolution, as the service flow is automatically generated and depicted with device related information as part of the network topology display, assisting a technician interested in problem management issues regarding the network.

Figure 8:
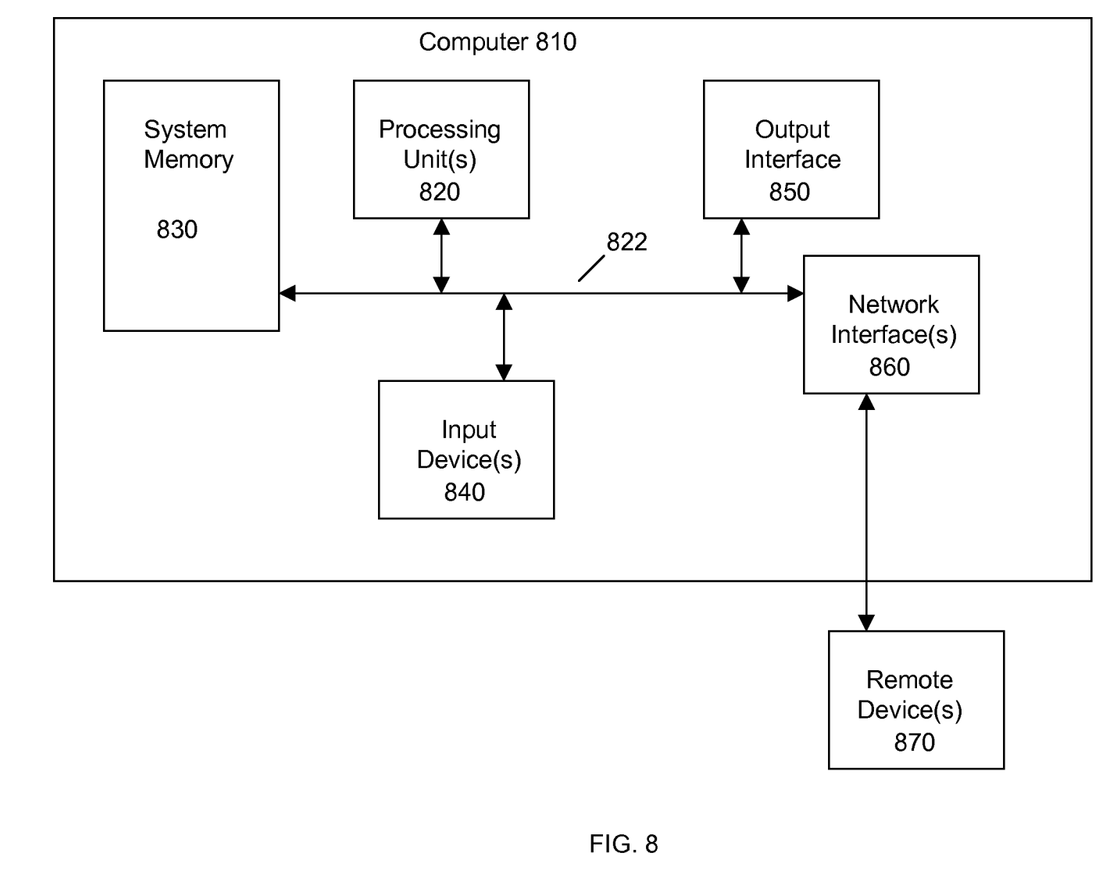
FIG. 8 illustrates an example computer system.

It will be readily understood that certain embodiments can be implemented using any of a wide variety of devices or combinations of devices. An example device that may be used in implementing one or more embodiments includes a computing device in the form of a computer 810. In this regard, the computer 810 may execute program instructions configured to implement a network topology tool, issue queries, and perform other functionality of the embodiments, as described herein.

Components of computer 810 may include, but are not limited to, a processing unit 820, a system memory 830, and a system bus 822 that couples various system components including the system memory 830 to the processing unit 820. Computer 810 may include or have access to a variety of computer readable media. The system memory 830 may include computer readable storage media in the form of volatile and/or nonvolatile memory such as read only memory (ROM) and/or random access memory (RAM). By way of example, and not limitation, system memory 830 may also include an operating system, application programs, other program modules, and program data.

A user can interface with (for example, enter commands and information) the computer 810 through input devices 840. A monitor or other type of device can also be connected to the system bus 822 via an interface, such as an output interface 850. In addition to a monitor, computers may also include other peripheral output devices. The computer 810 may operate in a networked or distributed environment using logical connections to one or more other remote computers or databases, such as databases storing presence information or virtualized presence information. The logical connections may include a network, such local area network (LAN) or a wide area network (WAN), but may also include other networks/buses.

It should be noted as well that certain embodiments may be implemented as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied therewith.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
    accepting query input comprising identification of network connected endpoint devices of a voice over internet protocol network;
    communicating the query input to a virtualized presence server;
    wherein the virtualized presence server employs a hierarchy of query processing cells to implement a scalable virtualization platform;
    each of said query processing cells comprising a virtual presentity defined by a specific membership set, wherein presence status of each of said query processing cells is an aggregation of presence data of individual members of the membership set; and
    employing the virtualized presence server to obtain, from one or more presence servers, a resolved network topology of network service flow for the network connected endpoint devices of the query input;
    the resolved network topology including:
        one or more network elements connecting the network connected endpoint devices; and
        device-related information relating to the one or more network elements;
        wherein the device-related information comprises information regarding a network problem related to the one or more network elements; and
    said obtaining of the resolved network topology comprising using network adapters for:

gathering data from various heterogeneous network data sources;
the gathered data comprising at least one of: network events, call setup/teardown, topology change, event router state;
transforming the data into presence schemas;
publishing the data to the one or more presence servers;
wherein said adapters gather the data in real time as and when one or more data changes relating to one or more network events occur;
wherein the hierarchy of query processing cells comprises three levels comprising a path stitcher query processing cell, at least one segment resolver query processing cell and neighborhood resolver query processing cells;
said obtaining of the resolved network topology comprising using the hierarchy of query processing cells to implement topology stitching service logic via:
using the path stitcher query processing cell to receive a failed call detail record, divide a path corresponding to the failed call detail record into segments and pass on the segments to the at least one segment resolver query processing cell;
using the at least one the segment resolver query processing cell to resolve the segments, find nodes and find links connecting the nodes;
using the neighborhood resolver query processing cells to find a next-hop neighboring node for each node; and
using the path stitcher query processing cell to combine the resolved segments to form a resolved path.

2. The method according to claim 1, wherein the identification of network connected endpoint devices comprises a caller identification and a callee identification.

3. The method according to claim 2, wherein the caller identification comprises a phone number and wherein the callee identification comprises a phone number.

4. The method according to claim 1, wherein the one or more network elements comprise: network elements connecting the network connected endpoint devices to provide service flow to the network connected endpoint devices; and
wherein the network elements comprise one or more of edge routers and core routers.

5. A computer program product comprising:
a non-transitory computer readable storage medium having computer readable program code embodied therewith, the computer readable program code comprising:
computer readable program code configured to accept query input comprising identification of network connected endpoint devices of a voice over internet protocol network;
computer readable program code configured to communicate the query input to a virtualized presence server;
wherein the virtualized presence server employs a hierarchy of query processing cells to implement a scalable virtualization platform;
each of said query processing cells comprising a virtual presentity defined by a specific membership set, wherein presence status of each of said query processing cells is an aggregation of presence data of individual members of the membership set; and
computer readable program code configured to employ the virtualized presence server to obtain, from one or more presence servers, a resolved network topology of network service flow for the network connected endpoint devices of the query input;
the resolved network topology including:
one or more network elements connecting the network connected endpoint devices; and
device-related information relating to the one or more network elements;
wherein the device related information comprises information regarding a network problem related to the one or more network elements; and
wherein the obtaining of the resolved network topology comprises:
gathering data from various heterogeneous network data sources;
the gathered data comprising at least one of: network events, call setup/teardown, topology change, event router state;
transforming the data into presence schemas;
publishing the data to the one or more presence servers;
wherein said adapters gather the data in real time as and when one or more data changes relating to one or more network events occur;
wherein the hierarchy of query processing cells comprises three levels comprising a path stitcher query processing cell, at least one segment resolver query processing cell and neighborhood resolver query processing cells;
the obtaining of the resolved network topology comprising using the hierarchy of query processing cells to implement topology stitching service logic via:
using the path stitcher query processing cell to receive a failed call detail record, divide a path corresponding to the failed call detail record into segments and pass on the segments to the at least one segment resolver query processing cell;
using the at least one the segment resolver query processing cell to resolve the segments, find nodes and find links connecting the nodes;
using the neighborhood resolver query processing cells to find a next-hop neighboring node for each node; and
using the path stitcher query processing cell to combine the resolved segments to form a resolved path.

6. The computer program product according to claim 5, wherein the identification of network connected devices comprises a caller identification and a callee identification.

7. The computer program product according to claim 5, wherein the one or more network elements comprise: network elements connecting the network connected endpoint devices to provide service flow to the network connected endpoint devices; and
wherein the network elements comprise one or more of edge routers and core routers.

8. An apparatus comprising:
one or more processors; and
a memory operatively connected to the one or more processors;
wherein, responsive to execution of computer readable program code accessible to the one or more processors, the one or more processors are configured to:
accept query input comprising identification of network connected endpoint devices of a voice over internet protocol network;
communicate the query input to a virtualized presence server;
wherein the virtualized presence server employs a hierarchy of query processing cells to implement a scalable virtualization platform;
each of said query processing cells comprising a virtual presentity defined by a specific membership set, wherein presence status of each of said query processing cells is an aggregation of presence data of individual members of the membership set; and employing the virtualized presence server to obtain, from one or more presence servers, a resolved network topology of network service flow for the network connected endpoint devices of the query input;

the resolved network topology including:

one or more network elements connecting the network connected endpoint devices; and device-related information relating to the one or more network elements;

wherein the device related information comprises information regarding a network problem related to the one or more network elements; and wherein the obtaining of the resolved network topology comprises:

gathering data from various heterogeneous network data sources;

the gathered data comprising at least one of: network events, call setup/teardown, topology change, event router state;

transforming the data into presence schemas;

publishing the data to the one or more presence servers;

wherein said adapters gather the data in real time as and when one or more data changes relating to one or more network events occur;

wherein the hierarchy of query processing cells comprises three levels comprising a path stitcher query processing cell, at least one segment resolver query processing cell and neighborhood resolver query processing cells;

the obtaining of the resolved network topology comprising using the hierarchy of query processing cells to implement topology stitching service logic via:

using the path stitcher query processing cell to receive a failed call detail record, divide a path corresponding to the failed call detail record into segments and pass on the segments to the at least one segment resolver query processing cell;

using the at least one the segment resolver query processing cell to resolve the segments, find nodes and find links connecting the nodes;

using the neighborhood resolver query processing cells to find a next-hop neighboring node for each node; and using the path stitcher query processing cell to combine the resolved segments to form a resolved path.

* * * * *